Aug. 7, 1934.    R. W. ROSS    1,969,185
APPARATUS FOR USE IN TEACHING PIANO PLAYING
Filed March 23, 1932    6 Sheets-Sheet 1

Inventor
R. W. Ross.
By Lacey & Lacey,
Attorneys

Aug. 7, 1934.                R. W. ROSS                1,969,185
           APPARATUS FOR USE IN TEACHING PIANO PLAYING
                 Filed March 23, 1932        6 Sheets-Sheet 3

Inventor

R. W. Ross.

By Lacey & Lacey, Attorneys

Aug. 7, 1934.  R. W. ROSS  1,969,185
APPARATUS FOR USE IN TEACHING PIANO PLAYING
Filed March 23, 1932   6 Sheets-Sheet 6

Inventor
R. W. Ross.
By Lacey & Lacey,
Attorneys

Patented Aug. 7, 1934

1,969,185

UNITED STATES PATENT OFFICE 1,969,185

APPARATUS FOR USE IN TEACHING PIANO-PLAYING

Robert Wilson Ross, Mansfield, Pa.

Application March 23, 1932, Serial No. 600,743

14 Claims. (Cl. 84—175)

The object of this invention is to provide an apparatus whereby a class of piano pupils may be taught as successfully as though each pupil was alone in receiving instruction. The invention provides means whereby a plurality of keyboards upon which the pupils perform, and which are not associated directly with sound-producing mechanism, will be connected with a piano the keys of which will be operated in unison with the keys actuated at the several keyboards, and also provides means whereby any one of the keyboards may be disconnected at the will of the teacher so that a pupil who is performing improperly may be detected and permitted to perform upon his own keyboard without disturbing the other pupils. The invention also has for its object the provision of electrically controlled devices connected with the several keyboards for operating pneumatic mechanism which will actuate the keys of the piano. Other objects of the invention will appear incidentally in the course of the following description.

In the accompanying drawings.

The reference numeral 1 indicates an upright piano of any approved make and the reference numerals 2 indicate silent keyboard instruments, which are provided in any number sufficient to accommodate the class of pupils which is to use them, and which are connected with the piano so that when a key upon any of the keyboards is depressed, as in playing a piano, the corresponding key of the piano will be depressed and the piano action actuated to sound the corresponding note. While, in the drawings, I have illustrated an upright piano and piano keyboards connected therewith, it is to be understood that the particular form of the piano is immaterial and the invention may be utilized for instruction upon an organ, and, in the following description and claims, where the term "piano" is used, it is to be understood as including organ consoles and similar keyboard instruments.

Figures 1, 2:
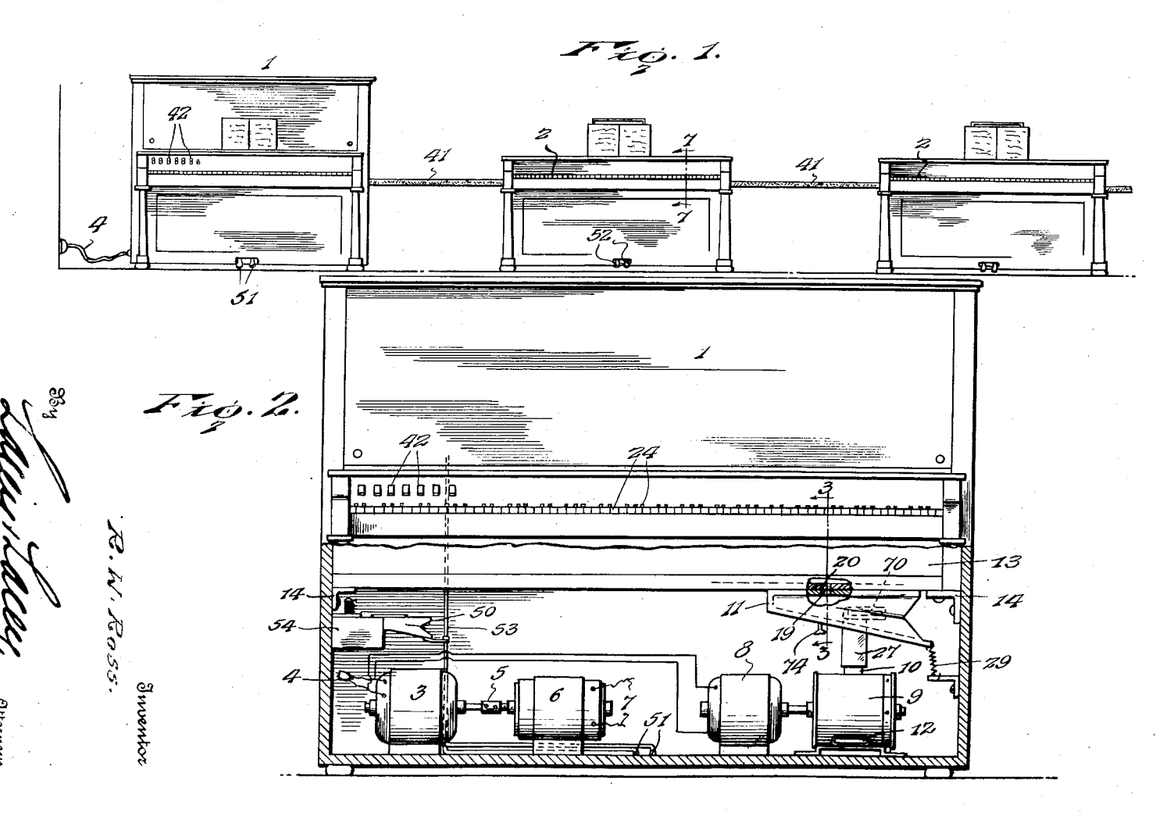
Figure 1 is an elevation showing a piano and a plurality of keyboards connected therewith.
Fig. 2 is an enlarged view, partly in front elevation and partly in section, of the piano with which the keyboards are connected.
Figure 3:
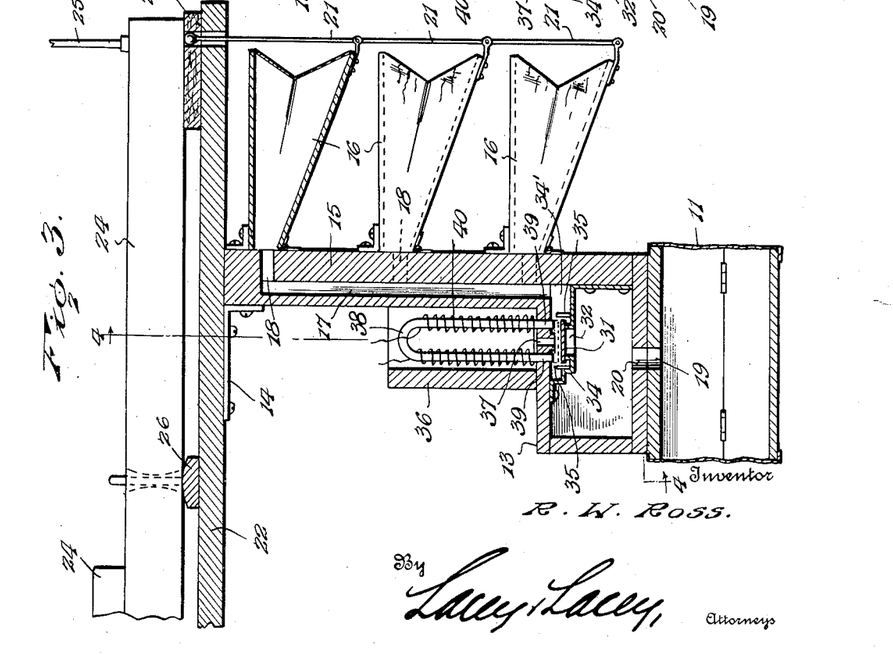
Fig. 3 is an enlarged transverse section on the line 3—3 of Fig. 2.
Figure 4:
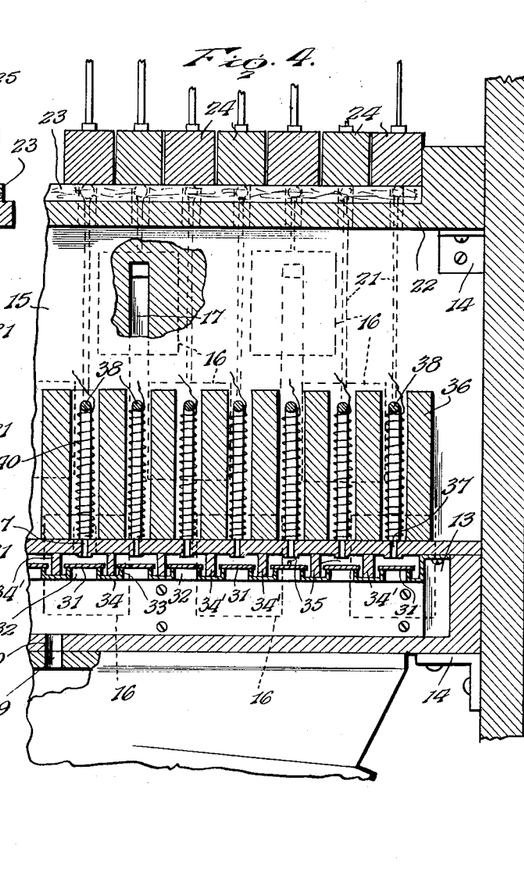
Fig. 4 is a section on the line 4—4 of Fig 3.
Figures 5, 6, 7:
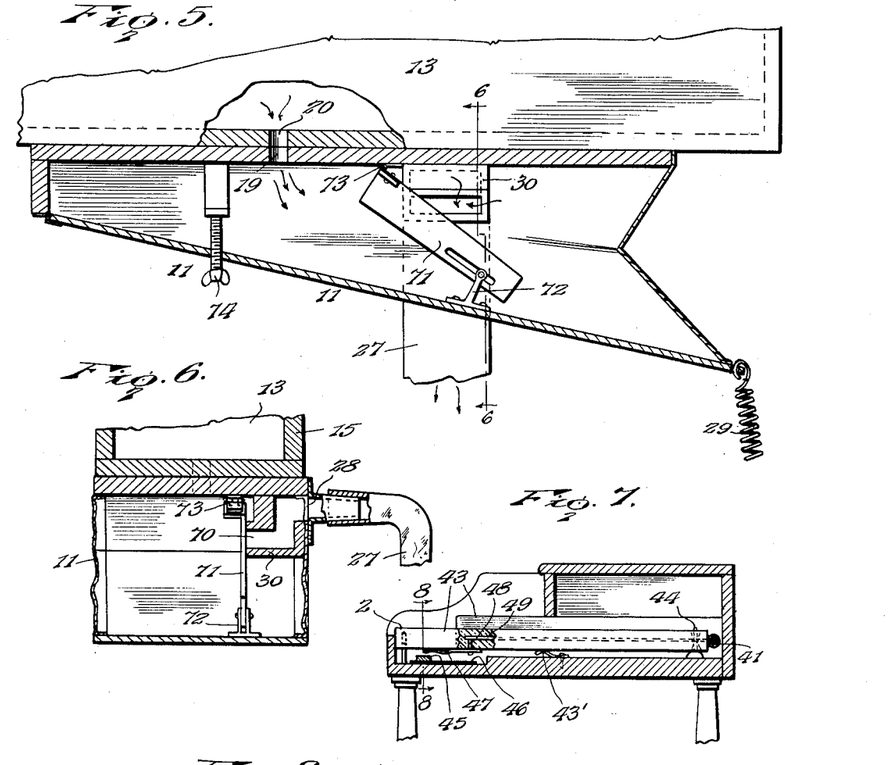
Fig. 5 is an enlarged view, partly in section and partly in elevation, of the exhaust pneumatic.
Fig. 6 is a section on the line 6—6 of Fig. 5.
Fig. 7 is a transverse section on the line 7—7, Fig. 1, through one of the keyboard instruments used by a pupil.
Figure 8:
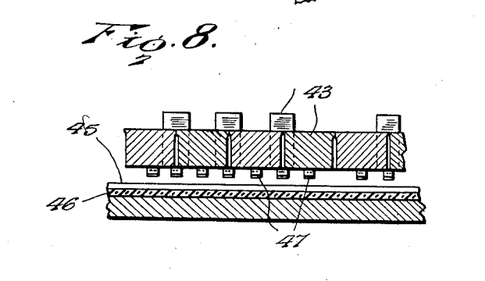
Fig. 8 is an enlarged section on the line 8—8 of Fig. 7.

The mechanism constituting the essential note-playing elements of the present invention is preferably installed in the piano below the keyboard thereof but it may, of course, be installed in such manner as will be most convenient under any given circumstances and which will be best adapted to the particular instrument in which it is installed. Referring to Fig. 2 more particularly, there is located in the lower portion of the piano a motor 3 which receives current through a cord 4 which may be plugged in a socket provided in the electric supply system of the building, as will be understood upon reference to Fig. 1. This motor 3 has its shaft coupled, as indicated at 5, to the shaft of a generator 6 so that a low voltage direct current will be produced to supply the several switches and other electrical instrumentalities utilized in the practice of the invention, a cable 7 extending from the generator to the several instrumentalities, as will later appear. It must be understood that the purpose of the generator 6 is to supply a direct current of low voltage and amperage and a battery may be substituted for this unit. Moreover, the generator or battery may be located at some point outside the piano case. There is also located in the lower portion of the piano case a second motor 8 which receives current from the cord 4 and is coupled directly to an exhaust pump 9, the intake 10 of which is connected with an exhaust pneumatic 11 and the outlet 12 of which may be carried through the piano casing or merely left open to discharge within the piano case. Disposed below the keyboard of the piano is a wind chest 13 which may be supported within the piano casing in any convenient manner, as by brackets, indicated at 14, which are secured to the chest and to the piano frame or case. The rear wall 15 of the chest rises therefrom and has mounted upon its rear side a plurality of pneumatics 16, one pneumatic being provided for each key of the instrument and being operatively connected therewith so that when the pneumatic is collapsed the key will be actuated. As indicated in Figs. 3 and 4, the pneumatics are arranged in three banks or rows in order that all of them may be accommodated within the length of the keyboard. The rear wall 15 of the chest 13 has a plurality of conduits 17 therein each of which opens through a lateral port 18, at its upper end, into one of the pneumatics and all the passages or conduits 17 open, at their lower ends, into the chest, as clearly shown in Fig. 3. The exhaust pneumatic 11 is secured directly to the bottom of the chest 13 and communicates therewith through a port 19 in the top of the exhaust pneumatic and an axially alined port 20 in the bottom of the chest, as clearly shown. Each pneumatic comprises a top and a bottom of some non-bending material, the top of the pneumatic being rigidly secured to the supporting element and the bottom of the pneumatic being hinged to the support so that it may move toward or from the top in the operation of the apparatus. The top and bottom are connected by a flexible cover, of leather, rubber, or other material, which will resist leakage of air and may readily fold like a bellows. To the bottom of each pneumatic 16 is attached a rod 21 which extends upwardly therefrom through the key bed 22 of the piano and through the cushion 23 upon which the rear ends of the several keys 24 rest so that the upper ends of the rods will bear against the bottoms of the respective keys at the rear ends thereof, as clearly shown in Fig. 3. The rear end of the key is connected, as usual, with the piano action by a lifting rod 25 and the weight of the action exerted through the lifting rod holds the key normally lowered at its rear end. The keys are mounted in the usual manner upon a rail 26 so that they may easily rock thereon, and it will now be understood that when any one pneumatic 16 is collapsed, by the exhaust of air therefrom, the rod 21 connected therewith will be raised and the corresponding key will be rocked so that the corresponding note upon the piano will be sounded. From what has been said, it will be understood that the exhaust pneumatic 11 receives the air from the chest 13 and is under a constant suction from the pump 9 through the flexible pipe 27 which connects the intake 10 of the pump with the outlet port 28 in the side of the exhaust pneumatic. The suction from the pump tends to collapse the pneumatic 11, and to yieldingly resist such tendency a retractile spring 29 is attached to the bottom of the pneumatic and to some fixed point below the same so that the pneumatic will be more or less expanded at all times to accommodate the inflow of air from the chest 13. As best shown in Fig. 6, a block 30 is fixed within the pneumatic and has a duct or channel 70 therein through which the air flows to the port 28. A cut-off valve is arranged to move across the inner end of the channel 70 to control the entrance of air thereinto and this valve consists of a plate 71 disposed with its side against the side of the block 30. The lower end of the plate is pivoted to a bracket 72 secured on the bottom of the pneumatic and its upper end is hinged, as at 73, to the top of the pneumatic, the pivot and the hinge being at opposite sides of a vertical line passing through the duct 70 midway the sides thereof. As the pneumatic tends to collapse, the lower end of the plate 71 will be carried upwardly so that a greater portion of the area of the plate will be disposed across the duct and the entrance of air to the duct correspondingly reduced. When the keys of the piano are rocked, air is expelled from the connected pneumatics through the wind chest and the flow into the exhaust pneumatic is accordingly augmented so that the latter will be expanded. The valve plate 71 is simultaneously rocked to uncover a greater portion of the end of the duct 70 to accommodate the greater volume of air. A set screw 74 is threaded through the bottom of the governor or exhaust pneumatic 11 and constitutes an adjustable stop to abut the top of the governor and prevent complete closing of the same.

Because of the suction from the pump 9, the air pressure within the chest 13 will be somewhat less than atmospheric pressure and the pneumatic 11 serves as a governor to keep the pressure approximately uniform. Communication between the chest and any one pneumatic 16 is normally cut off by a disk valve 31 disposed over the outlet port 32 through which the air from the passage 17 flows into the chest. This disk valve rests freely upon the rim 33, around the port, which rises from the partition or shelf 34, disposed longitudinally of the chest just below the top of the same and extending from end to end thereof, as will be understood upon reference to Figs. 3 and 4. Transverse partitions 34' are provided between adjacent outlet ports so that the several passages 17 are cut off from each other but all may communicate with the wind chest. Guide pins 35 are provided upon the partition 34, about the several valves, so that they will be held at all times in alinement with the respective outlet ports to properly seat thereover. The inlets to the several passages 17 are through boxes 36 provided upon the top of the chest in front of the rear wall 15 and open at their tops, as shown, ports 37 being provided through the top of the chest, at the lower ends of the several boxes, so that air flowing down through the boxes may enter the several passages 17 and thence flow into the respective pneumatics 16, as will be understood upon reference to Fig. 3. Within each box 36 is an electro-magnet 38, the ends or poles 39 of which are fitted through the top of the chest, above the respective valve disks 31, and said disks will constitute armatures for the magnets. When a magnet is energized, the disk is attracted and inflow of air is thereby cut off and outflow from the corresponding pneumatic established through the outlet 32 into the chest under the influence of the suction through the exhaust pneumatic 11. The exhausted pneumatic 16 will, consequently, collapse and the corresponding piano key 24 will be rocked to sound a note upon the piano. It should be understood that the boxes 36 may be omitted as they are merely guards for the magnets, and the magnets need not be very large, the only requisite being that they be strong enough to overcome the suction below the valves.

The windings 40 of the several magnets 38 form parts of circuits which are controlled through the several keyboards 2 and the conductors are carried past the several keyboards to the piano through cables 41 which are fed from the cable 7 connected with the generator 6. There is also provided, upon the piano, a plurality of levers 42 controlling cut-out switches which may be of any approved form although I illustrate a mechanism I prefer. These switches 42 permit the teacher to cut out one or more keyboards when he observes that a note is played incorrectly somewhere and, by trial, desires to locate the pupil who is not performing properly. The several silent keyboards 2 are provided with frames or cases somewhat resembling a piano casing in order to avoid the psychological effect of too strongly impressing upon a pupil the fact that he is performing upon a keyboard which is not equipped with note-producing actions. Each silent keyboard comprises a series of keys 43 of the same style and form as the keys of a piano and these keys 43 are mounted at their rear ends, as indicated at 44, for pivotal or rocking movement, springs 43', below the keys, holding their front ends normally raised. A bus bar 45 extends the full length of the keyboard under the front ends of the keys and is connected with a conductor in the cable 41 so that the bus bar forms a part of the electric circuit, and it rests upon a bed 46 of insulating material. On the underside of each key 43 is a resilient leaf or spring finger 47 which is adapted to make contact with the bus bar when the key is depressed so as to close a circuit which will energize the corresponding magnet 38 and effect rocking of the corresponding piano key 24. The finger or spring contact 47 is secured to the key by a screw or similar device 48 inserted within the key through the bottom of the same and the rear end of the spring finger to connect with a wire 49 which is embedded in the key and extends to the rear thereof where it is connected into a strand of the cable 41.

Figure 9:
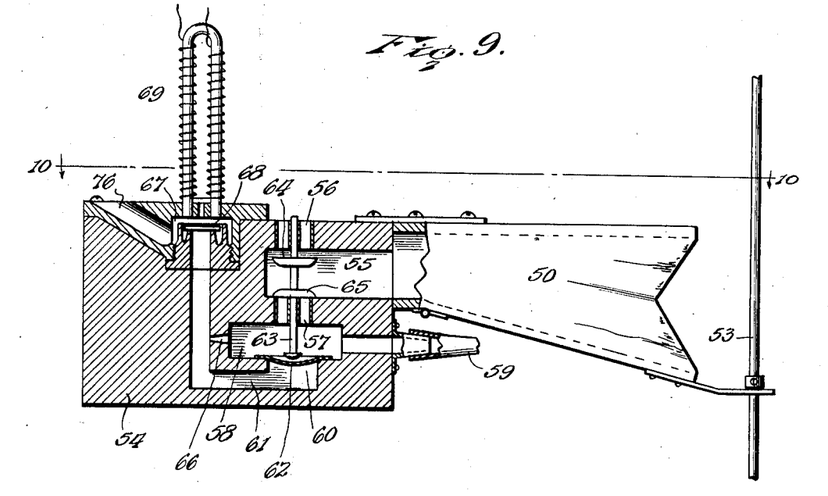
Fig. 9 is a view, partly in side elevation and partly in vertical section, of a portion of the pedal mechanism.
Figure 10:
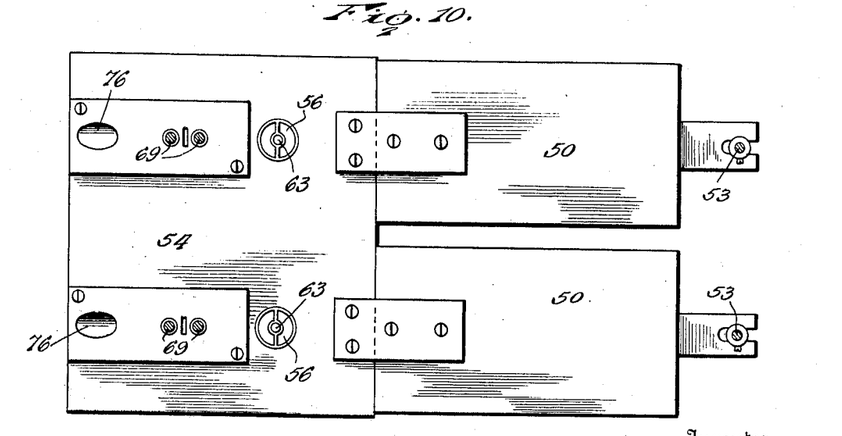
Fig. 10 is a view on the line 10—10 of Fig. 9.

There are also provided pneumatics 50 which have their movable sides connected mechanically with the pedals 51 of the piano and are governed electrically from the pedals 52 of the respective keyboards so that, when a pedal associated with any keyboard 2 is rocked, the corresponding pneumatic will actuate the corresponding pedal action of the piano. The pneumatics 50 are shown in detail in Figs. 9 and 10 and as they are larger than the pneumatics 16, a somewhat different operating connection is employed. The movable member of the pneumatic is operatively connected to the pedal-action rod 53, and the pneumatic is carried by a block 54 having a channel or chamber 55 which is in constant communication with the interior of the pneumatic. In one side of the chamber 55 is a port 56 through which air is admitted to the chamber to thence enter and inflate the pneumatic. Opposite the port 56 is a port 57 which establishes communication with a chamber 58 in the block, said chamber 58 being in constant communication with the wind chest 13 through a pipe 59. Alined axially with the ports 56 and 57 is a port 60 which forms one end of a duct 61 and is covered by a diaphragm 62 upon which rests the lower end of a valve stem 63 which passes through the ports 56 and 57 and is held to a rectilinear path by spiders therein, as clearly shown. The stem carries disk valves 64 and 65 which are so spaced thereon that when the port 56 is open the port 57 will be closed by the valve 65 and when the valve 65 is unseated the port 56 will be closed by the valve 64. A bleeder port 66 connects the chamber 58 with the duct 61 so that the suction or pressure on the opposite sides of the diaphragm 62 will be balanced and the diaphragm will be flexed downwardly under the weight of the valves and valve stem, the port 57 being closed and the port 56 being open to admit air to inflate the pneumatic. The duct 61 extends to a valve chest 67 where its end is normally closed by a metal valve disk 68 which constitutes the armature for an electromagnet 69 mounted on the block 54 and having its winding connected with circuit-closers or contacts at the pedals 52, as indicated at 75 in Fig. 11. A channel 76 leads from the outside of the block 54 to the valve chest 67 and acts with the suction from the governor 11 to hold the valve 68 normally seated. When a pedal 52 is depressed, a circuit is closed so that the corresponding electro-magnet 69 is energized and the valve 68 is lifted whereupon air rushes through the ducts 76 and 61 to the diaphragm 62, flexing the latter upwardly and thereby lifting the stem 63 to unseat the valve 65 and seat the valve 64. The pneumatic 50 will then be exhausted and the expression device actuated. When the magnet is de-energized, the parts return instantly to the normal positions shown in Fig. 9.

Figures 11, 13:
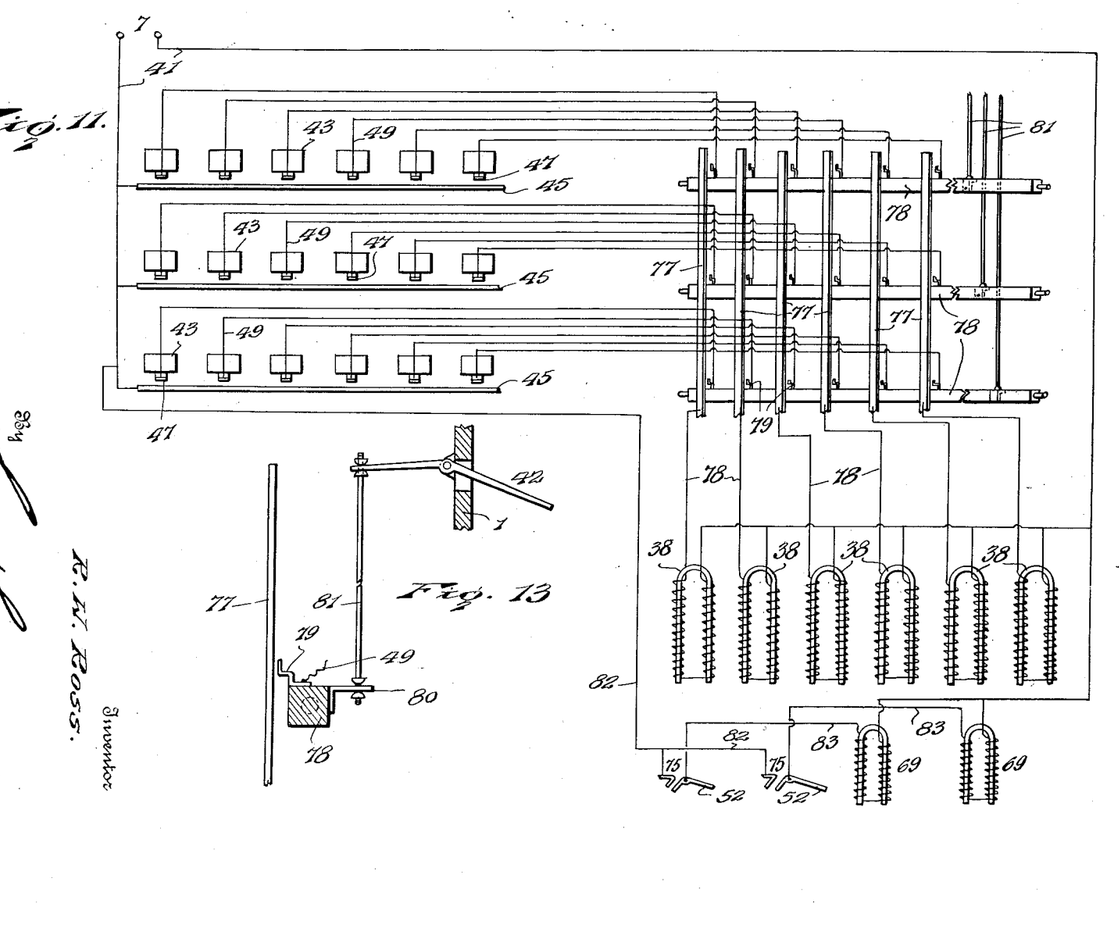
Fig. 11 is a diagram showing the keyboards connected in parallel.
Fig. 13 is a detail of a switch for cutting out a keyboard.

Referring now to Fig. 11, which shows parallel wiring, it will be readily seen that the current for the several keyboards and electromagnets passes from the cable 7 through a cable 41 to the several bus bars 45 and to the several circuit-closers and electromagnets. The several cut-out switches each includes a bus bar 77 one end of which is connected by a conductor with the winding of an electromagnet 38 which winding is connected to the opposite side of the circuit through the cable 41, these bus bars corresponding in number to the keys of the piano. Adjacent and disposed at right angles to the bus bars 77 are rocking bars or shafts 78 of insulation, one for each silent keyboard 2, and carried by each shaft are contacts 79 equal in number to the keys in a keyboard and each forming the terminal of a conductor 49. Adjacent one end, each rock shaft or bar is provided with a crank 80 with which is connected the lower end of a link 81, the upper end of which is connected to the rear end of the proper lever 42. The pedal circuit-closers 75 include a contact on the inner end of the pedal and a stationary contact arranged to be engaged by the contact on the pedal when the pedal is depressed. The fixed contacts are connected by conductors 82 in one side of the circuit and the contacts on the pedals are connected by conductors 83 with the respective magnets 69 and the opposite side of the circuit. If the levers 42 be rocked downwardly, the shafts 78 will be rocked so that the contacts 79 thereon will be engaged with the bus bars 77, but if any lever 42 be rocked upwardly the connected shaft will rock its contacts 79 away from the bus bars 77 and the corresponding keyboard 2 will be cut out. The pupil at the cut-out keyboard may continue to operate the keys but will not produce notes at the piano. If wrong notes are repeatedly sounded at the piano, the teacher may identify the offending pupil or pupils by successively cutting out different keyboards.

Figures 12, 14, 15:
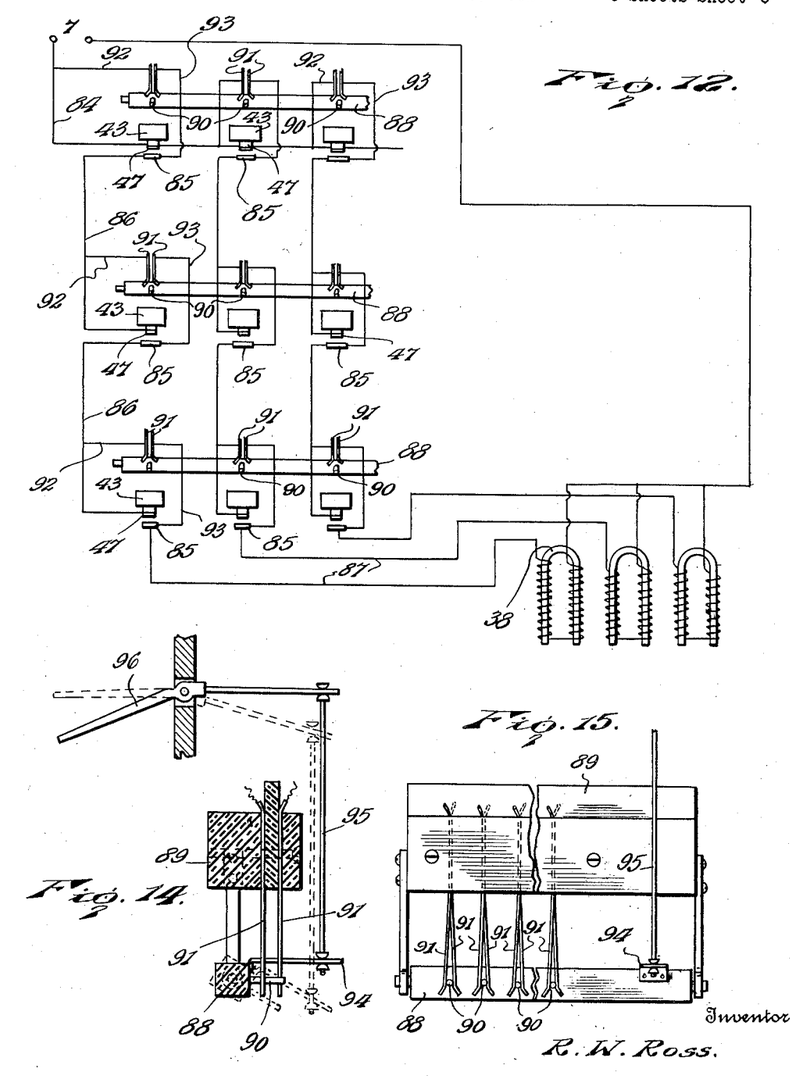
Fig. 12 is a diagram showing the keyboards connected in series.
Fig. 14 is a sectional view of another form of switch.
Fig. 15 is a rear elevation of the switch shown in Fig. 14.

In Fig. 12 I have indicated a series wiring. In this arrangement, a conductor 84 carries the current from the cable 7 on one side of the circuit to the spring contacts 47 on the undersides of keys 43 of one keyboard. Under each key is a fixed contact 85 which is connected by a conductor 86 with the contact 47 on the corresponding key of the next succeeding keyboard, the contact 85 on the last keyboard of the series being connected by a conductor 87 with the proper magnet 38 and then into the return side of the circuit. By this arrangement, no note will be sounded at the piano unless the proper key is struck at all the keyboards. For instance, if A is to be sounded at the piano, the circuit will be broken unless all the players strike the A key and no key at the piano will be operated.

If the pupil assigned to any keyboard should be absent, the idle keyboard may be cut out so that it will not prevent the use of the other keyboards. For this purpose, I provide at each keyboard, a rock shaft 88 of insulation mounted on a convenient support 89 adjacent the keys. Upon the rock shaft are a plurality of contact pins 90 which are alined radially of the shaft and correspond in position and number with the keys. These pins, in one position of the shaft, bridge the terminals 91 which are carried by the support 89 and, in another position of the shaft, are free of said terminals, as will be understood on reference to Fig. 14. One terminal 91 is connected by a conductor 92 with the lead-in conductor 84 or 86 and the other terminal is connected by a conductor 93 with the contact 85 so that when the terminals are engaged by the pin 90 the circuit will be shunted around the keys and the keyboard will be cut out. To set the shaft, it is provided with a crank 94 which is connected by a link 95 with an operating lever 96 which is mounted above the keyboard.

From the foregoing description, taken in connection with the accompanying drawings, it will be seen that I have provided a very compact and simple apparatus whereby a teacher of a class may give each scholar individual instruction without disturbing the class.

Having thus described the invention, I claim,

1. An apparatus for the purpose set forth comprising a keyboard musical instrument, a plurality of silent keyboards, means operatively connecting the silent keyboards with the keyboard of the instrument, and means whereby any one silent keyboard may be rendered inoperative.

2. Apparatus for the purpose set forth comprising a piano, a plurality of silent keyboards, operative connections between the silent keyboards and the piano whereby actuation of a key upon a silent keyboard will effect operation of a corresponding key upon the piano, and means at the piano for rendering any silent keyboard inoperative.

3. Apparatus for the purpose set forth comprising a piano, series of pneumatics operatively connected with the respective keys of the piano whereby collapse of a pneumatic will effect playing of the corresponding key, a plurality of silent keyboards, and a plurality of electric circuits controlled by the respective keys of the silent keyboards for selectively operating the pneumatics on the piano.

4. Apparatus for the purpose set forth comprising a piano, a plurality of pneumatics mounted at the piano and operatively connected with the respective keys thereof whereby collapse of any one pneumatic will effect playing of the connected key, a wind chest common to all the pneumatics, valves controlling the flow of air between the respective pneumatics and the wind chest, a pneumatic governor connected with the wind chest, means for maintaining substantially constant suction through the governor, a plurality of silent keyboards, and a plurality of electric circuits controlled by the keys of the respective silent keyboards whereby to operate the respective pneumatics and effect playing of the respective keys of the piano.

5. In apparatus for the purpose set forth, a piano, a wind chest supported adjacent the keys of the piano, a plurality of pneumatics operatively connected with the respective keys of the piano, passages leading from the respective pneumatics to the wind chest, ports admitting air to said passages, valves controlling flow through said passages, electro-magnets for setting the valves to direct flow through said passages to the pneumatics or from the pneumatics to the wind chest, a plurality of silent keyboards, and means whereby the keys of said silent keyboards will energize the respective magnets.

6. An apparatus for the purpose set forth comprising a keyboard musical instrument, pneumatics for operating the keys of the instrument, electro-magnetic valves controlling the pneumatics, a remote silent keyboard, and electric circuits for operating the electro-magnetic valves from the remote silent keyboard, said circuits including a bus bar extending under all the keys of the keyboard, contacts on the undersides of the keys to engage the bus bar, and a return conductor common to all of said contacts.

7. Apparatus for the purpose set forth comprising a piano, a plurality of pneumatics mounted at the piano and operatively connected with the respective keys thereof whereby collapse of any one pneumatic will effect playing of the connected key, a wind chest common to all the pneumatics, valves controlling the flow of air between the pneumatics and the wind chest, a plurality of silent keyboards, and a plurality of electric circuits controlled by the keys of the respective silent keyboards whereby to operate the valves for the respective pneumatics and effect playing of the several keys of the piano.

8. Apparatus for the purpose set forth comprising a keyboard musical instrument, a plurality of silent keyboards remote from the instrument, and a plurality of electric circuits controlled by the respective keys of the silent keyboards for selectively operating the keys of the instrument.

9. Apparatus for the purpose set forth comprising a keyboard musical instrument, a remote silent keyboard, a plurality of pneumatics each operatively connected with a key of the instrument, means whereby the pneumatics may be selectively operated from the remote silent keyboard to sound notes on the instrument, a wind chest common to all the pneumatics, an exhaust pneumatic connected with the wind chest, an outlet for the exhaust pneumatic having its entrance disposed within the pneumatic, and a cut-off within the pneumatic connected with the top and bottom thereof and movable across the exhaust pneumatic outlet as the pneumatic inflates or collapses.

10. Apparatus for the purpose set forth comprising a keyboard musical instrument, remote silent keyboards, electromagnets controlled by the remote silent keyboards, means controlled by the electro-magnets whereby to produce notes at the instrument, and means to render a remote silent keyboard inoperative including fixed contacts in circuit with the electro-magnets, a rock shaft, contacts on the shaft adapted to engage the fixed contacts, and means for rocking the shaft.

11. Apparatus for the purpose set forth comprising a keyboard musical instrument, a keyboard independent of and remote from the instrument, electrical circuits controlled by the keys of the keyboard for operating the keys of the instrument, and means at the musical instrument for rendering the keyboard inoperative.

12. Apparatus for the purpose set forth comprising a keyboard musical instrument, pneumatics connected with the keys of the instrument for operating the same, electro-magnetic valves controlling the pneumatics, a remote silent keyboard, and electric circuits for operating the valves from the silent keyboard, said circuits including a bus bar extending under all the keys of the silent keyboard, contacts on the underside of said keys to engage the bus bar, conductors leading from the contact through the keys to the ends thereof remote from the contacts, and a return conductor common to all the conductors extending through the keys.

13. Apparatus for the purpose set forth comprising a keyboard musical instrument, pneumatics connected with the keys of the instrument for operating the same, electro-magnetic valves controlling the pneumatics, a remote silent keyboard, electric circuits for operating the valves from the silent keyboard, said circuits including a bus bar extending under all the keys of the silent keyboard, contacts on the underside of the keys to engage the bus bar, a return conductor common to all the contacts on the keys, and means for rendering the keyboard inoperative, said means comprising a rock shaft, contacts on the rock shaft, conductors connecting the contacts on the rock shaft with the contacts on the keys, and a bus bar adjacent the rock shaft to be engaged by the contacts thereon and electrically connected with the respective valves.

14. Apparatus for the purpose set forth comprising a keyboard musical instrument, pneumatics connected with the keys of the instrument for operating the same, electro-magnetic valves controlling the pneumatics, a remote silent keyboard, fixed contacts below the respective keys, contacts on the underside of the keys to engage the fixed contacts, all of said contacts being in circuit with the valves, pairs of fixed contacts in circuit respectively with the contacts on the keys and the contacts below the keys, a rock shaft, and contacts on the rock shaft to bridge the pairs of contacts whereby to shunt out the contacts on the keys.

ROBERT WILSON ROSS. [L. S.]